US005456122A

United States Patent [19]

Hassan et al.

[11] Patent Number: 5,456,122

[45] Date of Patent: Oct. 10, 1995

[54] CABLE LOAD TRANSDUCER

[75] Inventors: Scott E. Hassan, Middletown, R.I.; David A. Abdow, Somerset, Mass.; Robert C. Thibodeau, Wakefield, R.I.

[73] Assignee: The United States of America as represented by the Secretary of the Navy, Washington, D.C.

[21] Appl. No.: 322,668

[22] Filed: Oct. 13, 1994

[51] Int. Cl.$^{6}$ .......... G01L 5/13

[52] U.S. Cl. .......... 73/862.57; 73/862.391; 73/862.627

[58] Field of Search .......... 73/170.33, 862.391, 73/862.474, 862.541, 862.57, 862.627, 862.631, 862.632, 862.634

[56] References Cited

U.S. PATENT DOCUMENTS

| | | | |
|---|---|---|---|
| 2,520,923 | 9/1950 | Franzel et al. | 73/862.57 |
| 2,601,781 | 7/1952 | Fillion | 73/862.57 |
| 3,722,268 | 3/1973 | Crooke et al. | 73/862.391 |
| 3,927,560 | 12/1975 | Farr | 73/862.634 X |
| 3,992,934 | 11/1976 | Clark | 73/862.631 |
| 4,023,402 | 5/1977 | Watanabe | 73/855 |
| 4,106,335 | 8/1978 | Shatto | 73/862.57 X |
| 4,253,331 | 3/1981 | Unruh | 73/862.57 |
| 4,510,814 | 4/1985 | Espiritu Santo et al. | 73/862.57 |
| 5,127,275 | 7/1992 | Liguore | 73/862.391 |
| 5,152,183 | 10/1992 | Munzebrock | 73/862.627 X |

*Primary Examiner*—Hezron E. Williams
*Assistant Examiner*—Elizabeth L. Dougherty
*Attorney, Agent, or Firm*—Michael J. McGowan; Prithvi C. Lall; Michael F. Oglo

[57] ABSTRACT

An apparatus for measuring the loads, moments and torque at a constrained end of a cable created by the action of the cable in a fluid medium in which the cable is suspended. The cable is suspended in the medium by means of a strut. The apparatus connects the cable to the strut. The apparatus includes two flexure members, one rigidly connected to the strut, the other to the cable. A universal joint couples the two flexure members so that the flexure member connected to the strut can be fitted with strain gages to measure bending while the other flexure member has strain gages to measure axial force and torque. The universal joint enables the isolation of axial and torsional strains at the flexure member connected to the cable. The torsional loads are absorbed by the joint and the axial loads are transferred to bending loads at the flexure member attached to the strut. In operation, an object for which cable load vectors are being studied may be attached to the free end of the cable. The cable and object may then be towed through a fluid such as water by movement of the strut. Cable load vectors resulting from the action of the cable and the object in the fluid are then quantified by the apparatus.

14 Claims, 4 Drawing Sheets

Y
14
10
18
X
14a
16
12b
20
12a
12
22

CABLE LOAD TRANSDUCER

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to measuring the forces on one end of a cable. More specifically, this invention deals with a cable load transducer which is ideally suited for measuring loads, moments and torque at a constrained end of a cable created by the action of the cable in the fluid medium in which the cable is suspended.

(2) Description of the Prior Art

It is well known that commercially available strain gage devices are generally designed for measuring a single component of force or torque. Such devices measure either axial tension, bending moments, or torsion. When used at the attached or constrained end of a cable suspended in a fluid medium, these devices can be used to measure individual components of the load vector acting on the attached end of the cable. Such information may be useful in measuring loads, moments and torque on the cable created by an object under test being towed through the medium by the cable. The information obtained on the components of the load vector by these devices is not sufficient to quantify the load vector resulting from the combination of lift, drag and weight of the cable. Furthermore, these forces and moments acting on the cable can give rise to instabilities or a non-steady state load vector that cannot be accurately measured as a function of time with prior art strain gage technologies.

SUMMARY OF THE INVENTION

Accordingly, it is a general purpose and object of the present invention to provide a means for measuring the loads, moments and torque at the attachment end of a cable created by the cable or an object being towed from the other end of the cable through a fluid medium.

It is a further object to provide a means for measuring the time variations of such loads.

These objects are accomplished with the present invention by providing an apparatus for supporting a cable in a fluid such that the forces exerted on or by the cable can be quantified. An elongated element of longitudinally flexible configuration such as a cable has a free end portion capable of movement within the fluid and a constrained end attached to a strut. The present invention provides a convenient means for quantifying the forces at the strut, that is at the point connecting the cable to the strut. The invention comprises two flexure members interposed between the attached end of the cable and the strut and connecting the cable to the strut. The first flexure member is connected to the strut and also includes two strain gages for detecting bending induced strains. The strain gages are so arranged that one strain gage detects strains in the Y direction and the other detects strains in the Z direction, where Y and Z are mutually perpendicular to one another. The second flexure member is connected between the cable and the first flexure member and includes two additional strain gages for detecting strains induced by forces transmitted through the cable to the strut. One strain gage on the second flexure member detects strains induced by axial forces and the other strain gage detects strains induced by torsional forces. A universal joint is provided between the first and Second flexure members so that bending moments are absorbed solely by the first flexure member and do not adversely influence the axial and torsional strains detected by the strain gages on the second flexure member.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
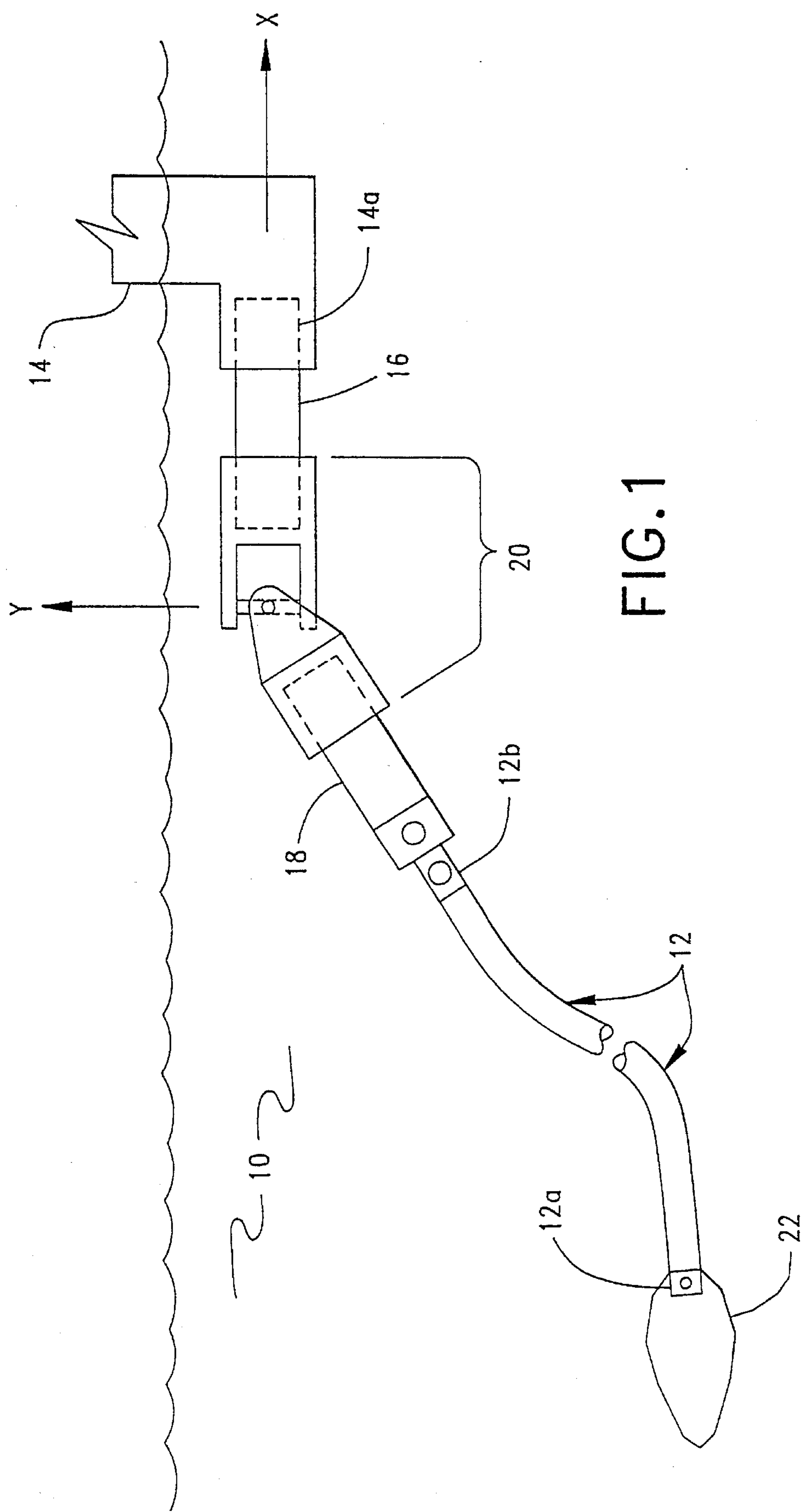
FIG. 1 shows the environment for a transducer system according to the present invention.

Turning now to the drawings in greater detail, and referring more specifically to FIG. 1, there is shown suspended in medium 10 a cable 12 having a free end **12*a* and an attached end 12*b*. A strut 14 is provided for suspending cable 12 by its attached end 12*b*. The lower portion of strut 14 defines a socket 14*a* for receiving a first flexure member 16. First flexure member 16 extends from socket 14*a* in a general direction X. A second flexure member 18 is coupled to first flexure member 16 at one end, and the other end is secured to attached end 12*b* of cable 12. The coupling means provided between first flexure member 16 and second flexure member 18 preferably takes the form of a universal joint as indicated generally at 20 in FIG. 1. As shown in FIG. 1, free end 12*a* of cable 12 may be adapted for towing object 22** under test conditions.

Figure 2:
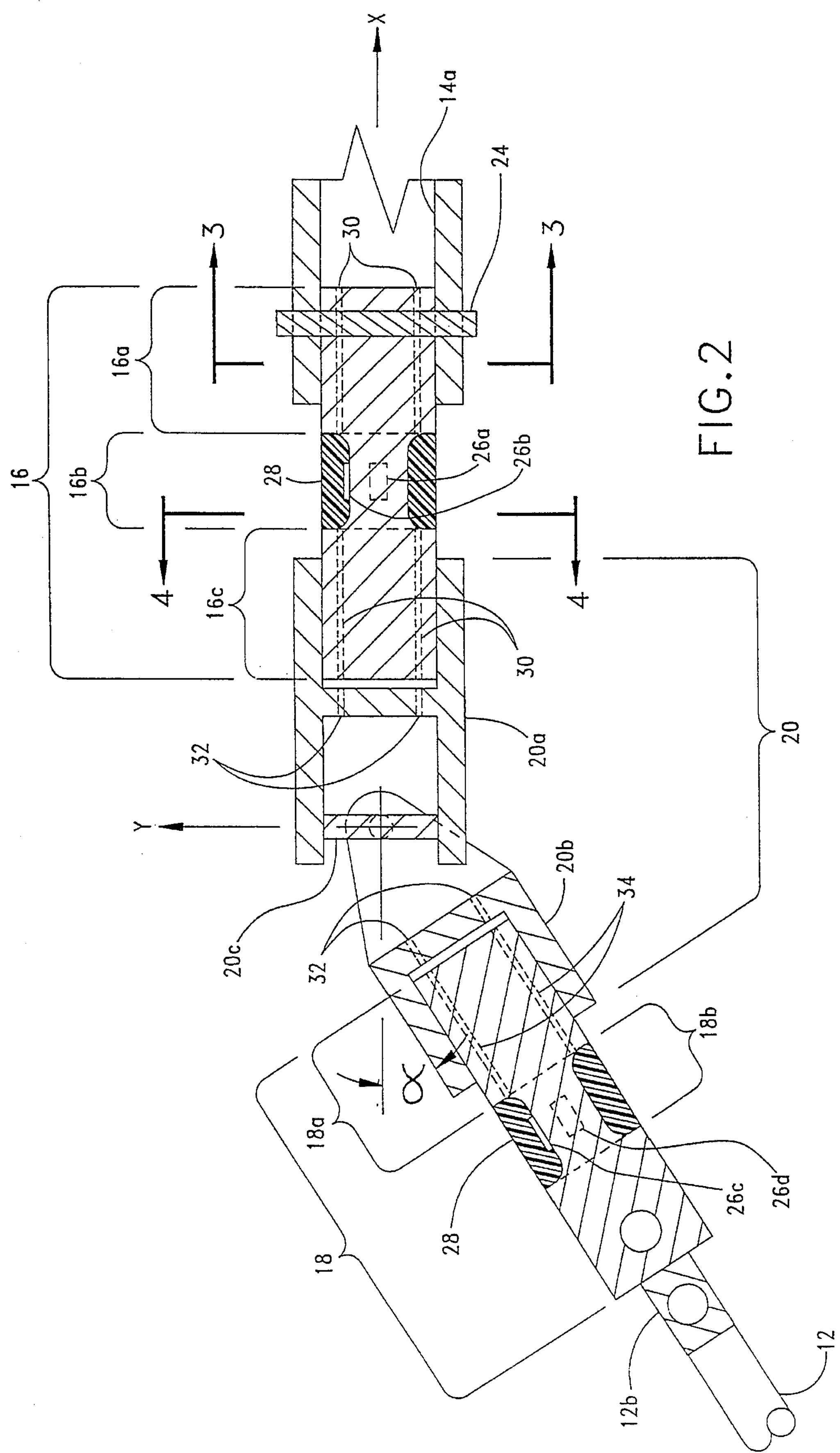
FIG. 2 shows a cross-sectional view of the transducer system of FIG.1 taken along a plane parallel to that of FIG. 1 and corresponding to the centerline of the transducer system.

FIG. 2 illustrates a cross-sectional view of the transducer system taken along a plane parallel to that of FIG. 1. The plane is defined by the X and Y axes as shown in FIG. 1, with the centerline of the transducer system lying within the plane. Socket **14*a* is shown in part for receiving strut end portion 16*a* of the first flexure member 16. A pin 24 is provided to secure first flexure member 16 within socket 14*a*. The axial direction of socket 14*a* defines an axis X and first flexure member 16 is oriented so that its longitudinal center line is arranged on the axis X. The axis X is oriented in a direction perpendicular to the plane defined by the mutually perpendicular axes Y and Z, such that the three axes define an orthogonal coordinate system, the axis Y being defined as the vertical and the axis Z (not shown) being perpendicular to the plane of FIG. 2. A necked down center portion 16*b* of flexure member 16 provides a convenient location for mounting first and second strain gage means 26***a* and 26*b* provided at mutually perpendicular locations and arranged to detect strains induced by bending about the Y and Z axes, respectively.

Second flexure member 18 is provided in mechanical series with first flexure member 16 and is coupled thereto by means of a universal joint indicated generally at 20. Universal joint 20 has first and second coupling hubs 20*a* and 20*b*, which hubs are joined to one another by a cross shaped trunion 20*c* to define a universal joint of the well known "hook joint" type. Hub end portion 16*c* of first flexure member 16 is secured in first coupling hub 20*a* and end portion 18*a* of second flexure member 18 is secured in second coupling hub 20*b*.

Second flexure member 18 is also provided with a necked down center portion 18*b* which serves as a locating surface for third strain gage means 26*c* adapted to detect forces in an axial direction relative to the second flexure member. The necked down center portion 18*b* also includes a fourth strain gage means 26*d* to detect torsional strains caused by forces exerted on the second flexure member 18 by cable 12.

Filler material 28 fills out the necked down portions 16*b* and 18*b* to provide a generally cylindrical external contour for first and second flexure members 16 and 18, the cylindrical contour being more streamlined than the necked down contour. Additionally, filler material 28 may be neoprene or similar material to provide a waterproof covering for strain gages 26*a–d*.

The strains detected by first and second strain gages 26*a* and 26*b* on first flexure member 16 can be used in combination with the axial and torsional strains detected by third and fourth strain gages 26*c* and 26*d* on second flexure member 18 to calculate the angular orientation, α, of attached end 12*b* of cable 12 with respect to axis X.

Circumaxially spaced apertures 30 are provided in strut end portion 16*a* of first flexure member 16 for passage of electrical leads (not shown) to strain gages 26*a* and 26*b* mounted in necked down portion 16*b* of first flexure member 16. Electrical leads connect strain gages 26*a* and 26*b* to conventional electrical bridge circuitry (not shown) for acquiring data on the above mentioned forces and moments and performing calculations. Apertures 30 further extend through hub end portion 16*c* of first flexure member 16. Corresponding apertures 32 in first and second coupling hubs 20*a* and 20*b* allow for passage of electrical leads to end portion 18*a* of second flexure member 18. Additional apertures 34 in end portion 18*a* allow passage of electrical leads to strain gages 26*c* and 26*d* mounted in necked down portion 18*b* of second flexure member 18. In necked down portions 16*b* and 18*b*, electrical leads are imbedded within filler material 28 to protect the electrical leads from exposure to the fluid medium 10 of FIG. 1.

Figure 3:
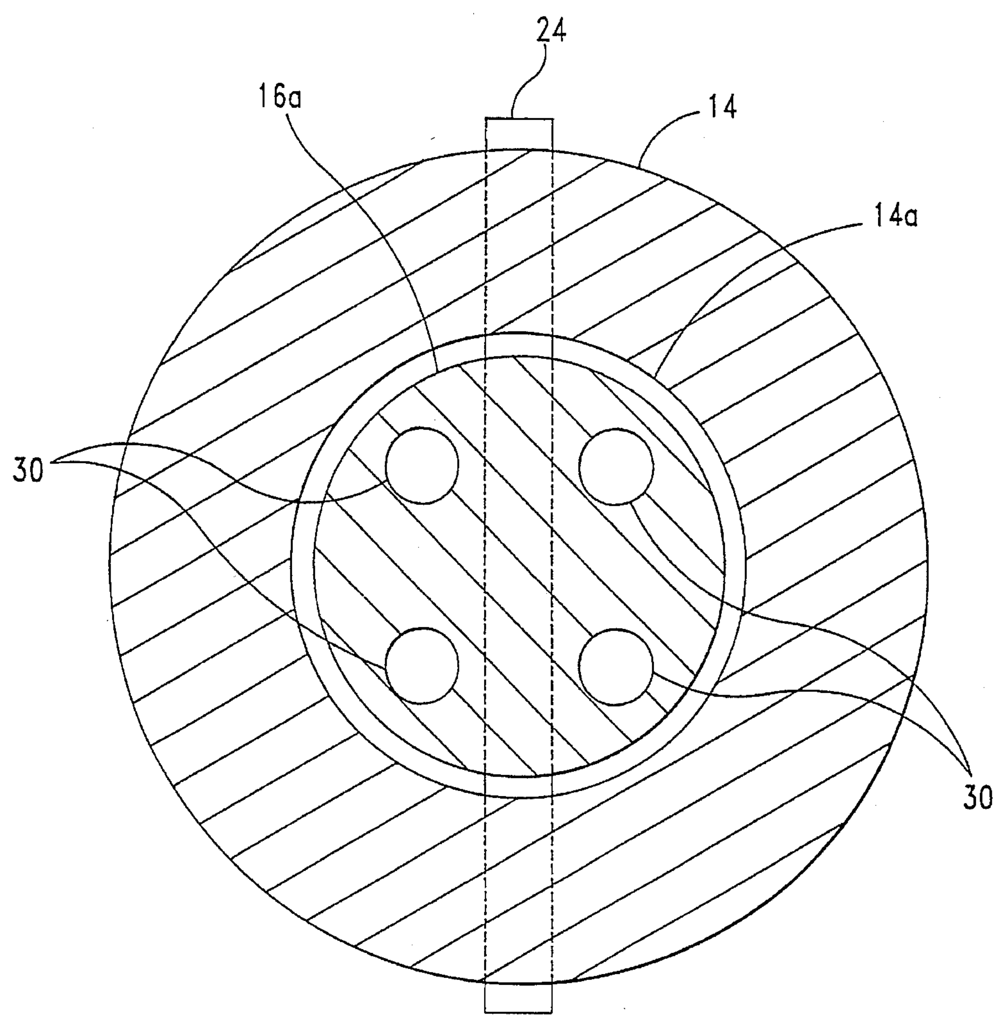
FIG. 3 shows a cross-sectional view of the transducer system of FIG. 2 taken along a line 3—3 thereof.

FIG. 3 shows a cross-section of strut end portion 16*a* secured to socket 14*a* of strut 14 with pin 24. Apertures 30 are circumferentially spaced so as not to intersect pin 24.

Figure 4:
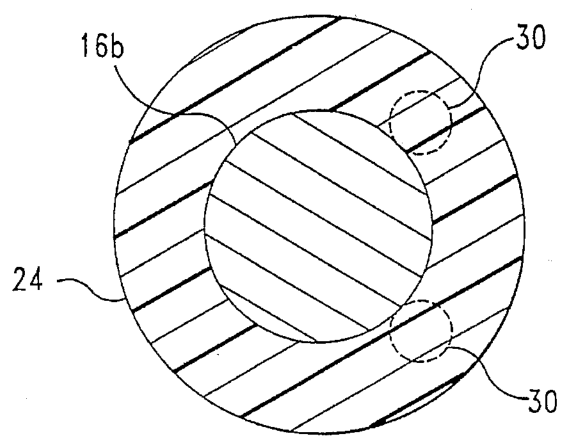
FIG. 4 shows a cross-sectional view of the transducer system of FIG. 2 taken along a line 4—4 thereof.

FIG. 4 shows a cross-section of necked down portion 16*b*. Filler material 28 fills out necked down portion 16*b* to generally maintain the cylindrical contour of first flexure member 16. Apertures 30 allow passage of electrical leads beyond first flexure member 16. A cross-section (not shown) of necked down portion 18*b* would be generally similar.

Figure 5:
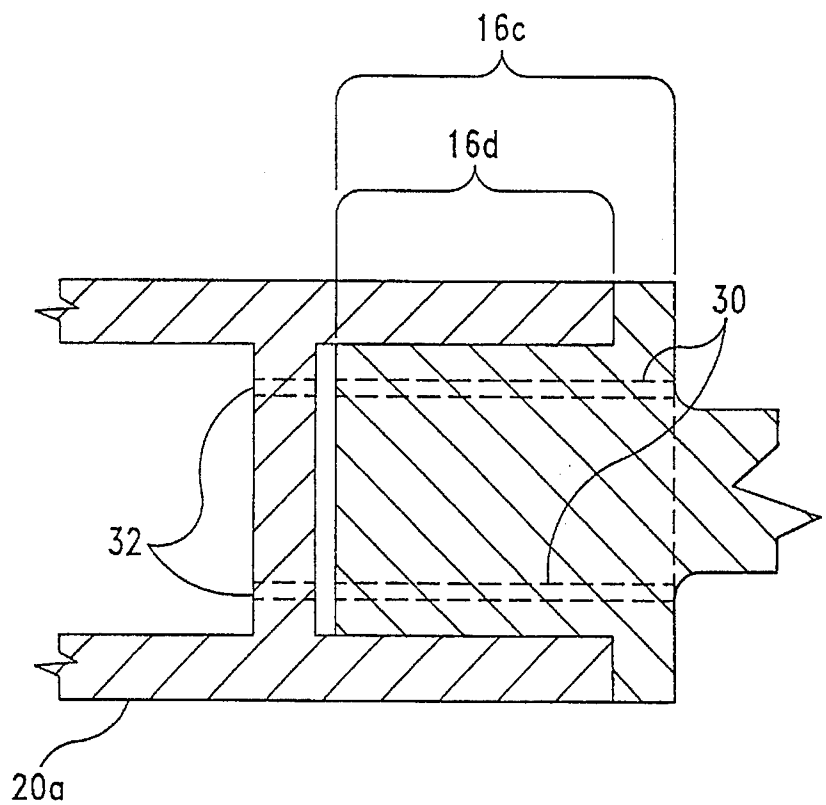
FIG. 5 shows a cross-sectional view of a second embodiment of the flexure member/universal joint connection.

FIG. 5 shows a partial cross-section of a second embodiment of the connection between hub end portion 16*c* and first coupling hub 20*a* taken along the same axis as FIG. 2. Hub end portion 16*c* has a reduced diameter portion 16*d*, allowing the external diameter of first coupling hub 20*a* to match the external diameter of hub end portion 16*c*. The connection between socket 14*a* and strut end portion 16*a* (not shown) and the connection between second coupling hub 20*b* and end portion 18*a* (not shown) would be similar to that indicated in FIG. 5. Apertures 30 and corresponding apertures 32 allow for passage of electrical leads (not shown). The matching external diameters maintain the generally cylindrical contour of the system.

Figure 6:
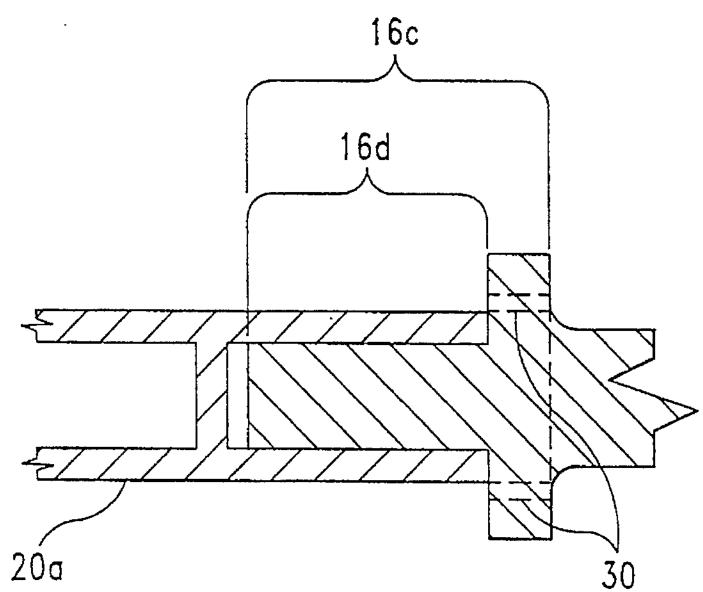
FIG. 6 shows a cross-sectional view of a third embodiment of the flexure member/universal joint connection.

FIG. 6 shows a partial cross-section of a third embodiment of the connection between hub end portion 16*c* and first coupling hub 20*a* taken along the same axis as FIG. 2. Hub end portion 16*c* has a reduced diameter portion 16*d* similar to the embodiment shown in FIG. 5. However, the size of first coupling hub 20*a* is minimized to provide the least disturbance to fluid flow around the system. The connection between socket 14*a* and strut end portion 16*a* (not shown) and the connection between second coupling hub 20*b* and end portion 18*a* (not shown) would be similar to that indicated in FIG. 6. Apertures 30 allow for passage of electrical leads (not shown). Electrical leads would be routed over the external surfaces of first coupling hub 20*a*.

In operation cable 12 is suspended or towed through a fluid medium 10 such as water. Cable 12 has a free end 12*a* within the medium and an attached end 12*b* connected to the inventive device, the inventive device being in turn attached to a strut 14. An object 22 under test may be attached to free end 12*a* and cable 12 may be towed through the medium. For example, object 22 may be a sonar array towed through sea water from a towing device such as a surface ship or submarine. Strut 14 would attach to the towing device. The inventive device comprises a first flexure member 16 attached to the strut 14, a second flexure member 18 connected to attached end 12*b* of cable 12 and a universal joint 20 connecting the first and second flexure members.

As mentioned, both flexure members 16 and 18 have areas of reduced cross section, necked down portions 16*b* and 18*b* respectively, so as to facilitate the deflection of flexure members 16 and 18 required for measurement by conventional strain gages. Universal joint 20 is provided in mechanical series between the first and second flexure members 16 and 18 in order to: (1) enable the isolation of axial and torsional strains at the second flexure member 18; (2) absorb the torsional loads at second flexure member 18; and (3) transfer the axial loads at second flexure member 18 to bending loads at first flexure member 16. The strain gage means associated with flexure members 16 and 18 are orientated in a manner to detect only axial and torsional strains at second flexure member 18, and only bending induced strains at first flexure member 16.

The advantages of the present invention over the prior art are that this arrangement minimizes the effects of strains measured by the first flexure member 16 from interfering with those measured by the second flexure member 18 and vice versa. Calculation of the actual load vector exerted at strut 14 by attached end 12*b* of cable 12 are greatly simplified if the forces and torque exerted at strut 14 are first isolated and then quantified. A further advantage of the present invention is that the freedom of movement afforded by the universal joint 20 permits the object 22 being towed and its cable 12 to exhibit non-steady state or oscillating motion that will produce transient forces which can in turn be measured in the system as described.

What has thus been described is an apparatus for isolating and measuring the forces, moments and torques at the attached end of a cable exerted by the cable suspended in a fluid medium.

Obviously many modifications and variations of the present invention may become apparent in light of the above teachings. For example, the universal joint 20 may be any coupling means providing for rotation about the Y and Z axes while allowing no rotation about the X axis. Similarly, socket 14*a* attachment of first flexure member 16 to strut 14 can be replaced with any number of attachment means for fixedly attaching first flexure member 16 to strut 14. Strut end portion 16*a* may be in the form of a plate connecting to a similar flat surface at strut 14 through a plurality of bolted connections. Object 22 may also be attached directly to second flexure member 18 in lieu of cable 12 being interposed between object 22 and second flexure member 18.

Also, flexure members 16 and 18 and coupling hubs 20*a* and 20*b* may be provided without apertures 30, 34 and 32 respectively. Electrical leads are then simply routed over the outside surfaces of strut 14, flexure members 16 and 18 and universal joint 20 instead of through these apertures. Further, the neck downed portions 16*b* and 18*b* need not be filled in with filler material 28 provided the strain gages and electrical connections are suitably protected. Finally, the inventive device may be adapted for use in different fluid mediums, or may also be adapted for use in air.

In light of the above, it is therefore understood that within the scope of the appended claims, the invention may be practiced otherwise than as specifically described.

What is claimed is:

1. An apparatus for towing an object and measuring the forces exerted by said object on said apparatus comprising:

a first flexure member, said first flexure member defining an axis (X);

a first strain gage means mounted on said first flexure member to detect bending strains in mutually perpendicular directions (Y and Z) oriented perpendicular to said axis (X);

a second flexure member secured to and supporting said object;

coupling means for joining said first and second flexure members, said coupling means allowing axial loads exerted by said object on said second flexure member to be transmitted as bending loads to said first flexure member, said coupling means absorbing torsional loads exerted by said object on said second flexure member, said coupling means isolating said torsional loads from said first flexure member, said coupling means comprising first and second coupling hubs associated with said first and second flexure members respectively, said coupling means further including a trunion member for pivotably connecting said coupling hubs to one another such that said coupling hubs are constrained from rotating about said axis (X) of said first flexure member; and second strain gage means provided on said second flexure member to detect axial and torsional strains.

2. An apparatus according to claim 1 wherein said first and second flexure members are of generally cylindrical external contour, said first and second flexure members having necked down portions for receiving said strain gage means.

3. An apparatus according to claim 2 wherein said necked down portions further comprise a filler material filling out said necked down portions to provide said generally cylindrical external contour for said first and second flexure members.

4. An apparatus according to claim 3 wherein said filler material is neoprene.

5. An apparatus for towing an object and measuring the forces exerted by said object on said apparatus comprising:

a first flexure member of generally cylindrical external contour, said first flexure member defining an axis (X);

a first strain gage means mounted on said first flexure member to detect bending strains in mutually perpendicular directions (Y and Z) oriented perpendicular to said axis (X);

a second flexure member of generally cylindrical contour secured to and supporting said object;

coupling means for joining said first and second flexure members, said coupling means allowing axial loads exerted by said object on said second flexure member to be transmitted as bending loads to said first flexure member, said coupling means absorbing torsional loads exerted by said object on said second flexure member, said coupling means isolating said torsional loads from said first flexure member; and second strain gage means provided on said second flexure member to detect axial and torsional strains, said first and second flexure members having necked down portions for receiving said strain gage means.

6. An apparatus according to claim 5 wherein said necked down portions further comprise a filler material filling out said necked down portions to provide said generally cylindrical external contour for said first and second flexure members.

7. An apparatus according to claim 6 wherein said filler material is neoprene.

8. An apparatus for towing an object and measuring the forces exerted by said object on said apparatus comprising:

a first flexure member of generally cylindrical contour, said first flexure member defining an axis (X), said first flexure member having a first necked down portion, said first flexure member further having a first plurality of apertures circumaxially spaced and extending axially therethrough to said first necked down portion;

a second flexure member secured to and supporting said object, said second flexure member having a second necked down portion, said second flexure member further having a second plurality of apertures circumaxially spaced and extending axially therethrough to said second necked down portion;

coupling means for joining said first and second flexure members, said coupling means allowing axial loads exerted by said object on said second flexure member to be transmitted as bending loads to said first flexure member, said coupling means absorbing torsional loads exerted by said object on said second flexure member, said coupling means isolating said torsional loads from said first flexure member;

a first strain gage means mounted on said first necked down portion, said first strain gage means detecting bending strains in mutually perpendicular directions (Y and Z) oriented perpendicular to said axis (X), said first strain gage means having first electrical leads passing through said first plurality of apertures; and a second strain gage means mounted on said second necked down portion, said second strain gage means detecting axial and torsional strains, said second strain gage means having second electrical leads passing through said first plurality of apertures and through said second plurality of apertures.

9. An apparatus according to claim 8 wherein said coupling means further comprises:

first and second coupling hubs associated with said first and second flexure members respectively, said first and second coupling hubs having hub apertures extending therethrough, said second electrical leads passing through said hub apertures; and a trunion member for pivotably connecting said first and second coupling hubs to one another such that said first and second coupling hubs are constrained from rotating about said axis (X) of said first flexure member.

10. An apparatus according to claim 9 wherein said first and second necked down portions further comprise a filler material filling out said first and second necked down portions to provide said generally cylindrical external contour for said first and second flexure members, said first and second electrical leads passing through said filler material.

11. An apparatus according to claim 10 wherein said filler material is neoprene.

12. An apparatus for towing an object and measuring the forces exerted by said object on said apparatus comprising:

a first flexure member of generally cylindrical contour, said first flexure member defining an axis (X), said first flexure member having a first necked down portion, said first flexure member further having a first plurality of apertures circumaxially spaced and extending axially therethrough to said first necked down portion;

a second flexure member secured to and supporting said object, said second flexure member having a second necked down portion, said second flexure member further having a second plurality of apertures circumaxially spaced and extending axially therethrough to said second necked down portion;

coupling means for joining said first and second flexure members, said coupling means allowing axial loads exerted by said object on said second flexure member to be transmitted as bending loads to said first flexure member, said coupling means absorbing torsional loads exerted by said object on said second flexure member, said coupling means isolating said torsional loads from said first flexure member, said coupling means further having a third plurality of apertures extending therethrough;

a first strain gage means mounted on said first necked down portion, said first strain gage means detecting bending strains in mutually perpendicular directions (Y and Z) oriented perpendicular to said axis (X), said first strain gage means having first electrical leads passing through said first plurality of apertures; and a second strain gage means mounted on said second necked down portion, said second strain gage means detecting axial and torsional strains, said second strain gage means having second electrical leads passing through said first plurality of apertures, through said third plurality of apertures and through said second plurality of apertures.

13. An apparatus according to claim 12 wherein said first and second necked down portions further comprise a filler material filling out said first and second necked down portions to provide said generally cylindrical external contour for said first and second flexure members, said first and second electrical leads passing through said filler material.

14. An apparatus according to claim 11 wherein said filler material is neoprene.

* * * * *